United States Patent [19] [11] 4,243,398
Nomura et al. [45] Jan. 6, 1981

[54] METHOD OF PRODUCING DIELECTRIC DIFFRACTION GRATINGS OR DIELECTRIC MULTILAYER INTERFERENCE FILTERS

[75] Inventors: Hidenori Nomura; Hiroshi Honmo; Shigeo Matsushita, all of Tokyo, Japan

[73] Assignee: Nippon Electric Co., Ltd., Tokyo, Japan

[21] Appl. No.: 8,979

[22] Filed: Feb. 2, 1979

[30] Foreign Application Priority Data

| Feb. 9, 1978 | [JP] | Japan | 53/14428 |
| Mar. 2, 1978 | [JP] | Japan | 53/24097 |
| Mar. 2, 1978 | [JP] | Japan | 53/24101 |
| Jun. 28, 1978 | [JP] | Japan | 53/78973 |

[51] Int. Cl.³ .................................. C03B 37/00
[52] U.S. Cl. ........................................ 65/2; 65/3 A; 65/4 B; 65/67; 264/1; 264/158; 427/163; 427/255.2
[58] Field of Search .............. 65/3 A, 2, 56, 110, 65/112, 70, 67, 4 B; 427/163, 162, 237, 248 B; 264/1, 158, 159

[56] References Cited

U.S. PATENT DOCUMENTS

| 1,125,468 | 1/1915 | Carnahan | 65/67 |
| 3,282,666 | 11/1966 | Gallagher et al. | 65/67 X |
| 3,711,262 | 1/1973 | Keck et al. | 65/3 A |
| 3,771,983 | 11/1973 | Straka | 65/56 X |
| 3,775,075 | 11/1973 | Keck et al. | 65/3 A |
| 3,823,995 | 7/1974 | Carpenter | 65/3 A X |
| 4,087,266 | 5/1978 | Irven et al. | 65/3 A X |
| 4,154,591 | 5/1979 | French et al. | 65/2 |

Primary Examiner—Robert L. Lindsay, Jr.
Attorney, Agent, or Firm—Hopgood, Calimafde, Kalil, Blaustein & Lieberman

[57] ABSTRACT

There is disclosed a method of producing dielectric diffraction gratings. This method comprises (a) preparing a preform by forming one upon another layers of two or more glasses having different refractive indices at a given period, and (b) cutting the preform into flat pieces.

3 Claims, 22 Drawing Figures

METHOD OF PRODUCING DIELECTRIC DIFFRACTION GRATINGS OR DIELECTRIC MULTILAYER INTERFERENCE FILTERS

This invention relates to an economical method of producing a large number of dielectric diffraction gratings or dielectric multilayer interference filters, of an improved quality, by one cycle of production steps.

A volume-type dielectric diffraction grating or interference filter which has a wavelength selectivity is an optical circuit element useful as a wavelength separation element for use in wavelength division multiplex optical communication systems.

Such volume-type dielectric diffraction gratings have hitherto been formed by recording three-dimensional interference patterns produced by two beams of light in a photographic plate, a film of bichromate gelatine or a photosensitive crystal, as one of the applications of holography (see, for example, "Optical Holography" by R. J. Collier et al, Academic Press, Inc., 1971). To produce a dielectric multilayer filter, which is a kind of reflecting dielectric diffraction grating, it is known to use an evaporation or sputtering method. (See for example, "Principle of Optics" (5th edition) by M. Born and P. Wolf, Pergamon Press, 1975). It is difficult, however, to economically produce a large number of optical elements of this type in one cycle of production steps. More specifically, the two-beam interference method requires a laser source having a high coherency or a highly precise and stable hologram exposure unit. The sputtering method not only requires skill in controlling the thickness of a film to be evaporated, but also involves difficulties in manufacturing a narrow band and high reflectivity (or high transmittivity) filter, because of the failure to increase the number of layers.

The search has continued for improved methods of producing dielectric diffraction gratings or dielectric multilayer interference filters. This invention was made as a result of that search.

OBJECTS AND SUMMARY OF THE INVENTION

Accordingly, a general object of the present invention is to avoid or substantially alleviate the above discussed problems of the prior art.

A more specific object of the present invention is to provide an economical method of producing a number of dielectric diffraction gratings or interference filters having desirable characteristics with a single cycle of production steps.

Another object of the present invention is to provide a small size dielectric diffraction grating or interference filter.

Still another object of the present invention to provide an interference filter of a narrow band and high efficiency.

Other objects and advantages of the present invention will become apparent from the following summary and description of the preferred embodiments of the present invention.

According to the present invention, there is provided a method of producing dielectric diffraction gratings or dielectric interference filters. This method comprises (a) preparing a preform by forming one upon another two or more glass layers which have different refractive indices at a given period or pitch, (b) heating and drawing the preform, thereby reducing a cross sectional area thereof to a desired valve and (c) cutting the preform into slices of a given size.

In one embodiment of the present invention, there is provided a preferred method for producing dielectric diffraction gratings. This method comprises (a) depositing films of two kind of glass which differ in refractive index alternately at a given period on the inside wall of or around a tubular or rod-shaped member, thereby producing a tubular preform, (b) cutting the preform diametrically, thereby producing a flat member, (c) heating and drawing the flat member until the thickness of the films of glass is reduced to a desired value, and (d) cutting the drawn member into minute pieces of diffraction gratings.

The present invention is contemplated to producing a number of dielectric diffraction gratings or multi-layer interference filters which have desirable characteristics required in a single cycle of production steps, by drawing a preform to reduce it to a given thickness. The preform consists of multiple layers of glass materials different in refractive index, which are formed one upon another at a given film thickness.

DESCRIPTION OF THE PREFERRED EMBODIMENTS

Figure 1:
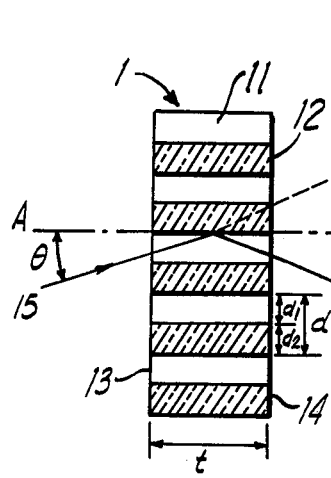
FIG. 1 is a cross-sectional view in the direction of stratum, of a dielectric diffraction grating, illustrating a basic structure thereof as well as the optical paths of light incident to the grating at a given angle with respect to the direction of stratum.

Referring first to FIG. 1, a dielectric diffraction grating 1 comprises a multilayer structure which consists of layers of glass 11 which have a high refractive index $n_1$ and a thickness $d_1$ and layers having a glass 12 of low refractive index $n_2$ and a thickness $d_2$ which are formed one upon another at a given pitch d. Dielectric diffraction grating 1 has parallel end faces 13 and 14 which are perpendicular to a direction of a film thickness. It is known that, among the light rays 15 incident onto the grating at an angle $\theta$ with respect to a line A—A' normal to end face 13 of this dielectric diffraction grating, light rays 16 having a wavelength satisfying equation (1) are diffracted in a given direction $\theta$ and intensified due to mutual interference, and on the other hand, light rays 17 having wavelengths do not satisfy equation (1) are transmitted therethrough:

$$m\lambda = 2(n_1 d_1 + n_2 d_2) \sin \theta \quad (1)$$

where, m is a desired positive integer.

It is also known that how the terms mentioned above must be met is dependent on a thickness t of the dielectric diffraction grating. For example, for a dielectric diffraction grating having $d = 2d_1 = 2d_2 = 900$ nm, and $t = 0.5$ mm designed for the service conditions of $\theta = 30°$ and $\lambda = 900$ nm, only light rays in the range of $\lambda = 897 \sim 903$ nm undergo diffraction.

Figure 2:
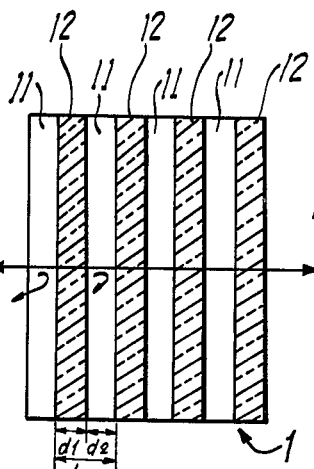
FIG. 2 is a cross-sectional view in the direction of stratum, of a dielectric diffraction grating, illustrating the optical paths of light incident to the grating parallel to the direction of stratum.

Referring to FIG. 2, for the incident light rays normal to the direction of film thickness, namely $\theta = 90°$, light rays having a wavelength satisfying equation (2) are selectively strongly reflected, and the dielectric diffraction grating serves as an interference filter.

$$m\lambda O = 2(n_1 d_1 + n_2 d_2) \quad (2)$$

In the interference filter, a reflection factor of selected light rays is dependent on the difference between refractive indices $n_1$ and $n_2$ and the number of layers. For example, assuming that $n_1 = 1.47$, $n_2 = 1.45$, $d = 0.41$ microns and the number of layers is 280, then a reflection factor of light rays having a wavelength of 1.2 microns is approximately 90 percent and a width of half value thereof is 0.007 microns.

The term "dielectric diffraction grating" used in the instant specification and claims is meant to include an interference filter, unless otherwise specified.

Figure 3:
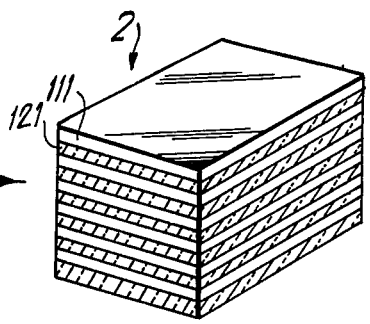
FIG. 3 is a perspective view of a preform of a dielectric diffraction grating, according to a first embodiment of the invention.
Figure 4:
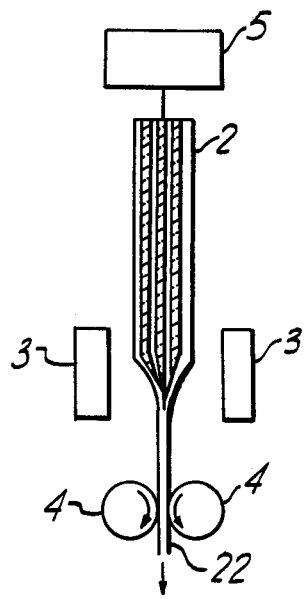
FIG. 4 is a cross-sectional view of the dielectric diffraction grating preform in the state of being drawn.

In FIGS. 3 and 4, a dielectric diffraction grating preform 2 has dimensions of 10 cm × 10 cm × 20 cm and is composed of 500 thin layers of glass 111 which has a high refractive index and 500 thin layers of glass 121 which has a low refractive index. The glasses are formed one upon another in the stratified state and fused to each other. Each glass layer has a dimension of 0.1 mm (thickness) × 10 cm (width) × 20 cm (length). Glass layer 111 is made of SF6 a dense flit glass manufactured by Fuji Photo Film Co. whose refractive index is 1.805, and glass layer 121 is made of BK7, a borosilicate crown glass, manufactured by Fuji Photo Film Co., whose refractive index is 1.516. Preform 2 is placed in heating furnace 3, and then fed in a vertical direction at a given velocity by feed unit 5. The heated and softened preform is pressed and drawn in the direction of stratum by means of drawing rollers 4. If the aforesaid dielectric diffraction grating preform is fed and drawn at a feed speed of 5 millimeters/minute and at a draw speed of 60 meters/minute, then the preform is drawn in heating furnace 3, so that its cross sectional area is reduced with the cross sectional geometry maintained in reduced scale, thus producing a drawn member having dimensions of 0.9 mm × 0.9 millimeter in cross sectional area, 900 millimeters in pitch and 2.5 kilometers in length. By cutting the drawn member in the longitudinal direction into a slice of 0.5 millimeter in thickness, there is obtained a dielectric diffraction grating having a thickness of 5 millimeters in given a wavelength of 900 millimeters and an angle of incidence of 30°, as shown in FIG. 1.

In this embodiment, a draw and reduction ratio, of a dielectric diffraction grating preform may be accurately set by controlling a draw and a feed speed. If a multistage drawing means were provided, an increased draw and reduction ratio would result, thus ensuring production of a member having small pitch with high precision, although such has been difficult with the conventional two-beam interference exposure method. As is apparent from the above description, a large number of dielectric diffraction gratings with minute openings needed for optical fiber communication are produced by one cycle of production steps.

In the preceding embodiments, the dielectric diffraction gratings have grating faces which are normal to the layers. If the drawn members were cut askew with respect to the longitudinal axis thereof into slices, dielectric diffraction gratings having aslant grating faces would result. If the thickness t is substantially increased by allowing light to enter in the direction of stratum, the slice would be used for producing a dielectric diffraction grating which is adapted to reflect the light rays of a specific wavelength alone, or a multilayer interference filter.

Figure 5:
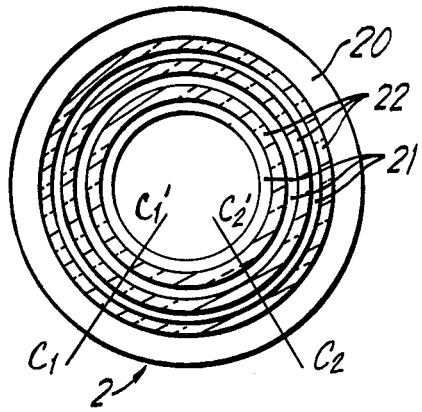
FIG. 5 is a transverse cross-sectional view of a preform of a dielectric diffraction grating, according to a second embodiment of the invention.
Figure 6:
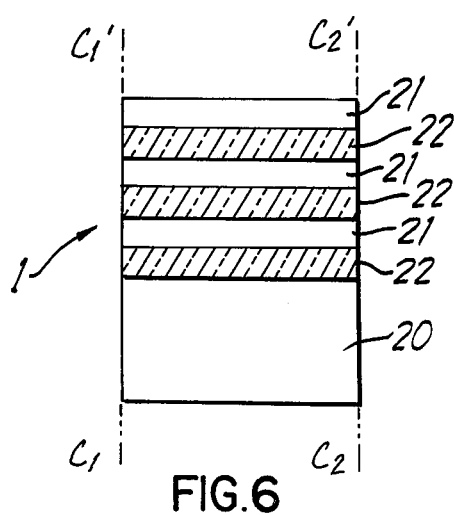
FIG. 6 is a cross-sectional view of a dielectric diffraction grating obtained from the preform shown in FIG. 5.
Figure 7A:
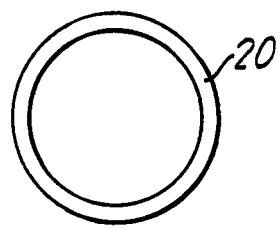
FIGS. 7A to E are cross-sectional views for illustrating respective steps of the method according to a third embodiment of the invention.
Figure 7B:
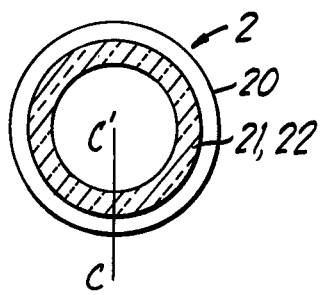

Referring to FIG. 5, there is illustrated quartz glass tube 20 which is used as a starting member, layer of glass 21 of high refractive index and layer of glass 22 of low refractive index, both of which are deposited one upon another on the inner peripheral wall of glass tube 20. These layers and the quartz glass tube are united into an integral dielectric diffraction grating preform 2. For deposition of layers of glass, the chemical vapor deposition method (CVD method), which has been established as an optical fiber producing technique, is most efficient and provides accurate control of film thickness (see, for example, U.S. Pat. No. 3,711,262). Quartz glass tube 20 has an inner diameter of 20 millimeters and is used as a starting member and rotatably retained on a glass lathe (not shown). While tube 20 is being swept by an oxyhydrogen flame, the gaseous glass materials such as silicon tetrachloride ($SiCl_4$) and boron trichloride ($BCl_3$) are mixed with oxygen ($O_2$) gas, and the mixture is introduced into the interior of the quartz glass tube, thereby forming a layer of low refractive index glass 22 having a thickness of 0.45 microns. Subsequently, gaseous glass materials containing silicon tetrachloride, germanium tetrachloride ($GeCl_4$) and oxyphosphorous chloride ($POCl_3$) are used for forming a layer of glass 22 of high refractive index of the same thickness as the former layer on the layer of low refractive index glass. 1000 layers of glass of low refractive index and 1000 layers of glass of high refractive index are alternately deposited, to thereby form the layers of deposited glass of 0.9 millimeter in thickness on the whole. In order to deposite such layers of glass over the sweeping range of 20 centimeters, a high frequency plasma reaction heat source having a sweep speed of 2 meters per minute is employed, and the time required has been about 200 minutes. The preform, having the layers of deposited glass, is cut crosswise into slices of a given length (equal to the size of an opening necessary for a dielectric diffraction grating). The circular slice is then cut radially along the lines C1—C1' and C2—C2', and heated in order to uncurl it, thereby forming a dielectric diffraction grating as shown in FIG. 6.

If the preform circular in cross section is cut crosswise into a slice of 0.9 millimeter in thickness and each slice is cut in the circumferential direction by 0.5 millimeter in length, then there is obtained a minute dielectric diffraction grating having an opening of 0.9 millimeter×0.9 millimeter, a thickness of 0.5 millimeters and grating pitch d=900 nanometers. From the preform of 20 centimeters in length, about 10,000 slices of dielectric diffraction grating are thus obtained. It is of course possible to remove the quartz glass tube 20 used as a starting member by means such as polishing, in the subsequent stage.

Referring to FIG. 7, the drawing A shows the step of preparing a quartz glass tube used as a starting member; B, the step of depositing glass materials on the inside wall of the quartz glass tube; C, the step of cutting the dielectric diffraction grating perform obtained by preceding step B radially at one or more points and shaping the preform to a flat member; D, the step of heating and drawing flat member 2' until the grating pitch is reduced to a desired value and E, the step of cutting a member 5 heated and drawn into a desired length, thereby producing a dielectric diffraction grating.

In this embodiment, the preform which has a grating pitch which is larger than a predetermined value is prepared beforehand by the same method as that used in the second embodiment, and the desired grating pitch is determined in the succeeding step. In this embodiment, control of the thickness of a deposited glass film is facilitated, with an increased yield, and a plurality of dielectric diffraction gratings having different grating pitches are obtained from a single preform.

In order to draw the dielectric diffraction grating preform, a heat-rolling method is employed in this embodiment. It is useful to employ a method in which the preform is drawn at the other end at a given rate, while the preform is being fed into the heating furnace, as shown in FIG. 4. In the latter case, by accurately controlling feed and draw speed, a predetermined reduction ratio is obtained. In this embodiment, the tubular preform is cut to a flat form and then heated in preparation for drawing. Alternatively, the tubular preform may be heated and drawn to a reduced diameter, or the quartz glass portion which is used as a starting member may be removed at the time the tubular preform is made flat or at the time the preform is cut into slices of dielectric diffraction grating, whatever the case may be.

Figure 8:
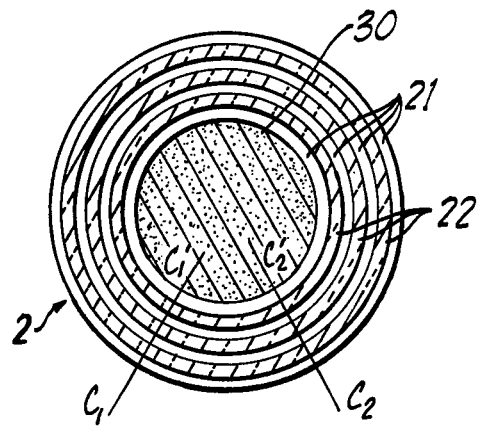
FIG. 8 is a transverse cross-sectional view of a preform of of a dielectric diffraction grating, according to a fourth embodiment of the invention.
Figure 7C:
Figure 7D:
Figure 9:
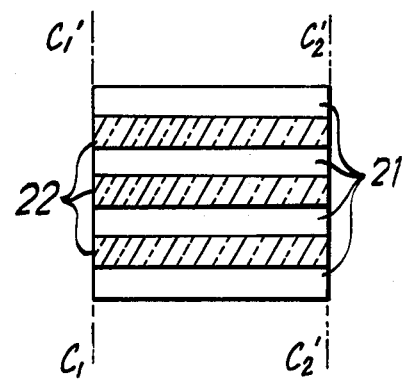
FIG. 9 is a cross-sectional view of a dielectric diffraction grating obtained from the preform shown in FIG. 8.
Figure 7E:
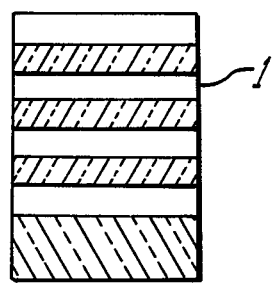
Figure 10A:
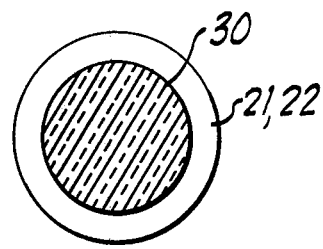
FIGS. 10A to E are cross-sectional views, for illustrating respective steps of the method according to a fifth embodiment of the present invention.

Referring to FIG. 8, there is illustrated carbon rod 30 which is a core around which films of glass are to be deposited, a layer of glass 21 of low refractive index, and a layer of glass 22 of high refractive index. These members are combined into an integral preform. If carbon rod 30 which has an outer diameter of 10 millimeters, a length of 20 centimeters and is rotably retained on a glass lathe, is swept while being heated by reciprocating the oxyhydrogen flame containing gaseous glass materials such as silicon tetrachloride, germanium tetrachloride, oxyphosphorous chloride and boron trichloride, then porous glass of high porosity having a multilayer structure will be formed around carbon rod 30. If the amount of refractive-index-variable-dopant such as germaninum, phosphor or boron is changed at every cycle of sweeping by oxyhydrogen flame, so as to deposit layers of glass having low refractive index and layers of glass having high refractive index one upon another respectively at a thickness of 0.9 microns and respectively by 1,000 layers, then there will be obtained a structure of multiple layers of glass having a thickness of 1.8 millimeters on the whole, whose refractive index changes periodically. This method of producing a film is known as an oxyhydrogen flame hydrolysis method (see, for example, U.S. Pat. No. 3,775,075 which relates to a method of producing optical fibers). The thickness of a glass film is accurately controlled by controlling the flow rate of gaseous glass materials which are fed into the oxyhydrogen flame. Thus, porous glass is separated from carbon rod 30 and slowly inserted into a furnace which is heated to an elevated temperature around the softening point of glass, whereby blow-holes in the glass are eliminated, and there is obtained a tubular preform of transparent multiple layers of glass which has the dimensions 5 millimeters diameter, 0.9 millimeter wall thickness, and 10 centimeters length, and which consists of layers of low refractive index glass 21 and layers of high refractive index glass 22, both of which are alternately and periodically deposited one upon another. If the tubular preform thus obtained is cut crosswise into slices of 0.9 millimeter in thickness and cut by 0.5 millimeter in length in the circumferential direction, then about 1,000 pieces of minute dielectric diffraction grating suited for use in optical fiber communication and having an opening of 0.9 millimeter×0.9 millimeter, a thickness of 0.5 millimeter and grating pitch d=900 nanometers is obtained.

Referring to FIG. 10, drawing A illustrates the step of depositing glass materials which have different refractive indices one upon another on a carbon rod used as a core, thereby forming porous glass, whose refractive index changes periodically in the direction of film thickness. B illustrates the step of removing the carbon rod which serves as a core and inserting the tubular porous glass into a high temperature heating furnace for degasing. C illustrates the step of cutting a transparent tubular preform obtained by the preceding degasing step at an end C—C' on the circumference thereof, to thereby provide a flat member. D illustrates the step of rolling flat member 2' while heating it to a temperature as high as the softening point of glass, so as to draw it until the desired thickness is obtained, i.e., until a desired grating pitch is obtained. E illustrates the step of cutting member 5 which is subjected to rolling into slices of dielectric diffraction gratings 1 which have a required opening and thickness. In this embodiment, a preform having a grating pitch larger than a given value is prepared beforehand, and the grating pitch required is provided in the subsequent drawing and reduction step. In this embodiment, a requirement for accurate control of a film thickness in the glass-material depositing step is moderated, with an increased yield, and a plurality of dielectric diffraction gratings having a different grating pitch are obtained from a single preform.

In this embodiment, the preform is drawn by being rolled during heating, and it is possible to employ a method in which the preform is drawn at the other end at a given rate while the preform is being fed into the heating furnace, as shown in FIG. 4. In the latter case, by controlling the feed and draw speed, a highly accurate, grating pitch reducing ratio is obtained. The carbon rod used as a core around which glass materials are to be deposited is merely illustrative. Other refractory or metallic materials may also be used.

In the former embodiments there have been shown, but are not limited to, dielectric diffraction gratings which are formed by depositing two kinds of glass materials one upon another and whose refractive index changes in a rectangular wave form in the direction of film thickness. Alternatively, it is possible to use two or more glass materials or change the components which are contained in glass materials, so as to provide a dielectric diffraction grating consisting of two or more kinds of glass layers which have different refractive indices deposited one upon another and presenting a desired configuration of refractive index distribution.

Figure 11A:
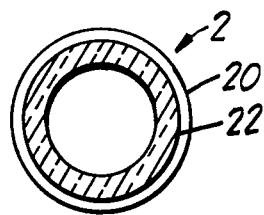
FIGS. 11A to C are cross-sectional views which illustrate respective steps of a sixth embodiment of the present invention; and, FIG. 12 is a fragmentary perspective view of a means for inflating an interference filter preform.
Figure 10B:
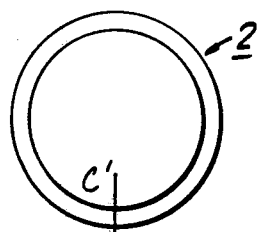
Figure 11B:
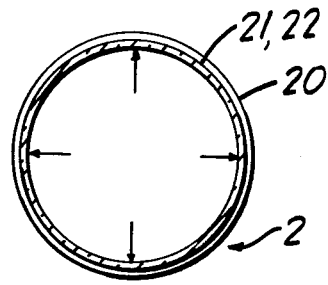
Figure 10C:
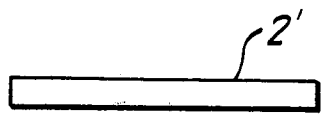
Figure 11C:
Figure 10D:
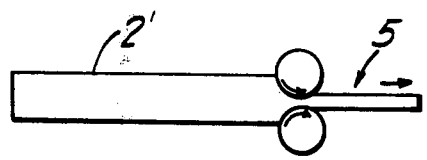
Figure 10E:
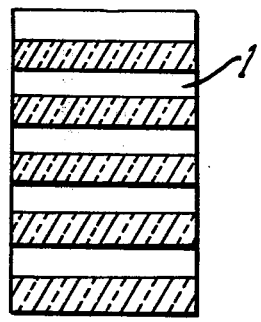
Figure 12:
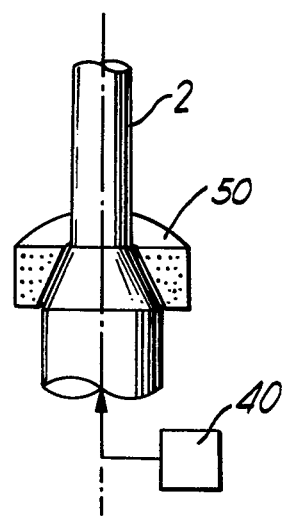

Referring to FIG. 11, in step A, gaseous materials such as $SiCl_4$, $GeCl_4$ and $O_2$ are mixed with each other at a rate of 20 milligrams, 15 milligrams and 1 liter, respectively, per minute, introduced into quartz tube 20 which has an inner diameter of 16 millimeters, and heated at a temperature of about 1400° C. by means of a heater which moves at a rate of 30 centimeters per minute, whereby a film of glass comprising a $SiO_2$-$GeO_2$ system is formed on the inside wall of quartz tube 20. If $BCl_3$ is used instead of $GeCl_4$, and is mixed with other glass materials at a rate of 2 milligrams per minute and introduced into the quartz tube, then a film of glass 22 of a $SiO_2$-$B_2O_3$ system is formed on the inside wall of the tube. $GeCl_4$ and $BCl_3$ are alternately mixed with other gaseous glass materials until a total of 120 layers have been formed by the CVD method. Thus, there is obtained a tubular multilayered interference filter preform having transparent films of glass deposited on the inside wall of the quartz glass tube, whose film thickness is about 0.4 microns and whose refractive index alternates between about 1.47 and 1.45. In step B, the internal pressure in the tubular preform is carefully raised at an elevated temperature in the range of 1500° to 1600° C. until the inner diameter of the tubular preform is enlarged to about 32 millimeters. The increase in the diameter of the tubular preform is accomplished by feeding nitrogen gas or compressed air from a pressure unit 40 into tubular preform 2 and by shifting a heating die 50 with a tapered inner cavity in the axial direction of the preform, as best illustrated in FIG. 12. In step C, the preform increased in diameter is cut to provide multilayer interference filters of 3 millimeters square. Thus, there is obtained a multilayer interference filter 1 consisting of layers of glass of a $SiO_2$-$GeO_2$ system and layers of glass of a $SiO_2$-$B_2O_3$ system, the thickness of each layer of which is 0.2 microns, and both of which are deposited one upon another repetitively at a pitch of 0.4 microns, and presenting strong reflection at a wavelength of about 1.2 microns for the incidence of light normal to the grating.

In this embodiment, the thickness of the transparent dielectric layers is rectified accurately to a desired value by adjusting the inner diameter of the tubular preform. Thus, there is ensured production of multilayer interference filters having desired filter characteristics at an increased yield and with high precision in manufacture. From the preforms prepared according to a common specification in CVD step A, a variety of multilayer interference filters which have different filter characteristics, for example, different central wavelength, may be obtained. Thus, a variety of multilayer interference filters may be produced by a reduced number of steps. Since the flow rate of gaseous materials is precisely controlled (i.e., less than 1 percent error) by means of a valve with a servo mechanism, the control of a thickness of layers of deposited glass as well as reproducibility of refractive index of glass are ensured. Since the CVD method provides a closer film of glass at an elevated temperature, as compared with the sputtering method, the increase in the number of layers is permitted, and such layers of glass present a narrow band and a high reflectivity stably, with the freedom of time-dependent deterioration.

In this embodiment, layers of glass are deposited on the inside wall of the quartz glass tube, but the method of producing a tubular preform is not limited thereto, and the CVD method as applied to the outer surface resorting to the flame hydrolysis method as referred to in FIG. 8 may be used. Included in the components which may be used to cause a variation in refractive index of a layer of glass formed by the CVD method are oxides such as germanium dioxide, boron oxide, phosphorous oxide, aluminum oxide, titanium oxide and gallium oxide; and as components for lowering the refractive index of the layer of glass, fluorine or fluorides such as calcium fluoride may be used as a second component for silicon dioxide. From the viewpoint of ease of treating materials and stability thereof, it is preferable that germanium dioxide or phosphorous oxide be used as a component for increasing refractive index, and that boron oxide be used as a component for lowering refractive index.

The present invention is characterized by the fact that (1) a large number of dielectric diffraction gratings are obtained during one cycle of production steps, (2) grating pitch control is facilitated, (3) dielectric diffraction gratings are obtained which have improved performance and which present a desired form of refractive index distribution, (4) the increase in the number of layers is facilitated, and (5) interference filters are obtained which have improved performance and an extremely narrow band.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in this art without departing from the spirit of the invention.

What is claimed is:

1. A method of producing dielectric diffraction gratings comprising
   (a) depositing films of two kinds of glass which differ in refractive index alternately at a given period on the inside wall of or around a tubular or rod-shaped starting member, thereby producing a tubular preform,
   (b) cutting said preform diametrically, thereby producing a flat member,
   (c) heating and drawing said flat member until the thickness of said films of glass is reduced to a desired value, and,
   (d) cutting said drawn member into minute pieces of diffraction gratings.

2. A method of producing dielectric diffraction gratings comprising
   (a) depositing films of two kinds of glass which differ in refractive index alternately at a given period on the inside wall of or around a tubular or rod-shaped starting member, thereby producing a tubular preform,
   (b) applying pressure to the interior of said tubular preform, so as to inflate said tubular preform during heating, thereby adjusting the film thickness to a desired value, and (c) cutting from said tubular preforms dielectric diffraction gratings.

3. The method of claim 2, wherein said films are prepared from glass materials selected from the group consisting of silicon dioxide and at least one of germanium dioxide, phosphorous oxide and boron oxide as a second component.

* * * * *